United States Patent [19]

Baghdady

[11] Patent Number: 4,920,348

[45] Date of Patent: Apr. 24, 1990

[54] METHOD AND APPARATUS FOR SIGNAL MODULATION AND DETECTION

[76] Inventor: Elie J. Baghdady, 21 Overlook Dr., Weston, Mass. 02193

[21] Appl. No.: 106,126

[22] Filed: Oct. 8, 1987

[51] Int. Cl.$^5$ ............................ G01S 5/04; H04B 1/10
[52] U.S. Cl. ................................. 342/433; 342/451; 342/405; 342/374; 455/283
[58] Field of Search ............... 342/433, 434, 336, 445, 342/374, 130, 131, 451, 405, 435; 455/266, 276, 277, 278, 303

[56] References Cited

U.S. PATENT DOCUMENTS

| | | | |
|---|---|---|---|
| 3,441,900 | 4/1969 | Ulstad et al. | 342/433 |
| 3,922,685 | 11/1975 | Opas | 342/374 |
| 4,060,809 | 11/1977 | Baghdady | 342/451 |
| 4,088,955 | 5/1978 | Baghdady | 455/283 |
| 4,106,023 | 8/1978 | Baghdady | 342/405 |
| 4,123,759 | 10/1978 | Hines et al. | 342/433 |
| 4,203,113 | 5/1980 | Baghdady | 342/418 |
| 4,328,591 | 5/1982 | Baghdady . | |

FOREIGN PATENT DOCUMENTS

A072023  3/1960  France ............................... 342/433

OTHER PUBLICATIONS

Electrical Engineers' Handbook–"Electric Communication and Electronics" (Fourth Edition), pp. 6-72 thru 6-75; Feeding and Phasing Systems.
"Beam Steering of Planar Phased Arrays" by T. C. Cheston, pp. 219-221.
Proceedings of the IEEE, vol. 56, No. 11, Nov. 1968–"Phased-Array Beam Steering by Multiplex Sampling" by Major A. Johnson, pp. 247-257.
"Properties of Phased Arrays*" by Wilhelm H. Von Aulock, pp. 37-49.
The Bell System Techinical Journal, vol. XLVI, No. 7, Sep. 1967, "Some Properties and Limitations of Electronically Steerable Phased Array Antennas*" by D. Varon and G. I. Zysman, pp. 163-168.
Proceedings of the IEEE, vol. 56, No. 11, Nov. 1968 "A Generalized Approach to the Analysis of Infinite Planar Array Antennas" by Bliss L. Diamond, pp. 69-83.

Primary Examiner—Thomas H. Tarcza
Assistant Examiner—David Cain
Attorney, Agent, or Firm—Burns, Doane, Swecker & Mathis

[57] ABSTRACT

The disclosure relates to methods and apparatus for separating radio signals arriving from different directions and for multiplexing signals intended for receivers dispersed in different directions. The methods and apparatus employ a plurality of antennas with spacing and individual feedline characteristics designed so that a modulation is imparted to each of a plurality of incident signals, for receiving antennas, and radiated signals for transmitting antennas, the modulation level of each signal being determined by the direction of propagation of the signal and by the spacing between antenna pairs. Accordingly, the orientation of lines connecting pairs of antennas as well as the spacing between antennas are set to inhibit the modulation in a particular direction, or to strip a particular modulation off a signal incident from a selected direction.

33 Claims, 6 Drawing Sheets

A········B········C········D

A ⇌ B
A ⇌ C
A ⇌ D
B ⇌ C
B ⇌ D
C ⇌ D

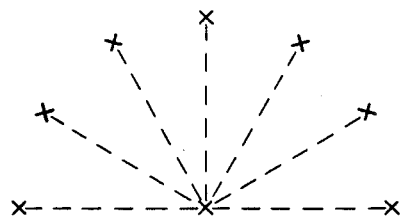
Fig.3
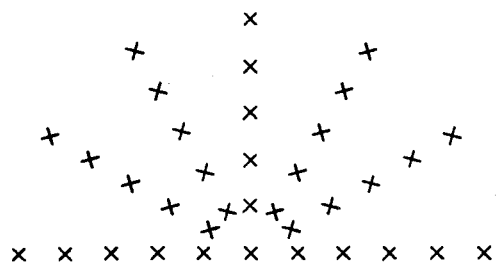
Fig.4-a
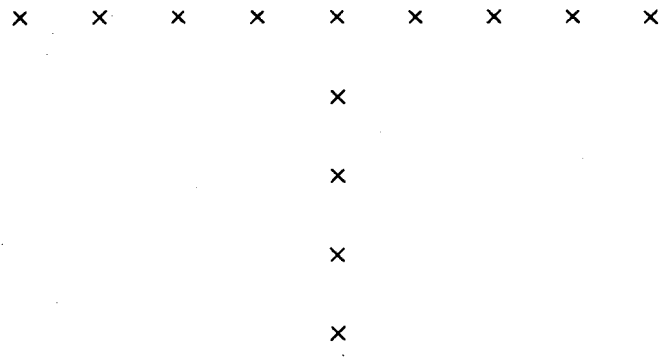
Fig.4-b 4,920,348

METHOD AND APPARATUS FOR SIGNAL MODULATION AND DETECTION

BACKGROUND OF THE INVENTION

This disclosure relates to methods and apparatus useful for discriminating between signals on the basis of the spatial orientations of the normals to their traveling wavefronts. Since the methods and devices disclosed herein may operate on signals that need differ only in the directions of propagation of their wavefronts, and may otherwise be of arbitrary relative strengths, waveforms, spectral or modulation characteristics, these methods and devices are particularly adapted to separate mutually interfering signals, as in multipath transmission, multitarget radar returns, electromagnetic jamming, and multiplex transmission.

Prior art techniques for discrimination between signals on the basis of the directions of arrival or of departure of their wavefronts are based on antenna pattern synthesis by aperture design or/and combining the simultaneous outputs of separate antennas in such ways as, in effect, to create directional mainlobes or/and directional nulls. Those prior techniques, while proven effective and often affordable for directions that differ by several degrees or more, they tend to become generally prohibitively costly when designed to resolve smaller directional differences, and when designed to adapt to changes in directions of wavefronts or/and to more than a few simultaneous wavefronts. These remarks are particularly applicable to operating frequencies in the lower microwave and below bands.

The techniques disclosed herein provide a means for discriminating between signals differing in the directions of propagation of their wavefronts by imposing on each signal a modulation that depends, in modulation level and/or modulation phase or time reference, upon the relative orientation of the normal to the signal wavefront. It is well-known from basic modulation theory that modulation of a carrier always results in a redistribution of a fixed amount of signal power over a frequency spectrum that is always wider than the original signal or carrier spectrum width, thus reducing the signal power density within that original bandwidth. Accordingly, with each signal thus modulated with a modulation level proportional to the direction cosine of its wavefront, the power spectral densities of the differently directed signals will be reduced within their original bands in amount determined by the square of the respective direction cosine. The discrimination between signals could then be based on which signal has its power spectral density within a specified band reduced more or less than which.

Accordingly, it is an object of the present invention to provide a spectrum spreading technique which diverts a portion of the signal power or energy from within the original signal bandwidth to outside of that bandwidth, the proportion thus diverted being dependent on the square of the direction cosine of the normal to the signal wavefront.

It is another object of the present invention to provide a means for distinguishing between signals by causing each to have a fraction of its power or energy, determined by the direction cosine of its wavefront, to be diverted into a more widely spread frequency range.

It is yet another object of this invention to provide a technique for causing a fraction of a signal's power, dependent on the direction cosine of its path ray, to be diverted into a new component signal whose carrier reference is of the same frequency as the original carrier reference but is orthogonally phased relative to the original carrier reference, and whose power or energy spectral density is spread out over a wider frequency range than the original signal.

It is yet another object of this invention to provide a means for separating two signals arriving from, or radiated to, different directions by causing none of the power or energy of one to be dispersed outside of its original bandwidth, while at the same time causing all of the power or energy of the other to be diverted to a spectrally spread replica of the original signal extending over a bandwidth wider than that of the original signal.

It is yet another object of this invention to provide a means for demultiplexing signals on the basis of the relative directions of the normals to their wavefronts, which may be referred to as *direction-division demultiplexing*.

It is yet another object of this invention to provide a means for demultiplexing signals on the basis of the relative directions of the normals to their wavefronts, which may be referred to as *direction-division demultiplexing*.

It is yet another object of this invention to provide a method for picking up signals or radiating them that causes a digital modulation to be imparted to some parameter (e.g., amplitude, phase, frequency or polarization) of each signal, such that the modulated parameter shift due to said imparted modulation is determined primarily by the direction cosine of the signal wavefront.

It is yet another object of this invention to provide a method for picking up signals or radiating them that causes an analog modulation to be imparted to some parameter (e.g., amplitude, phase, frequency or polarization) of each signal, such that the modulated parameter deviation due to said imparted modulation is determined primarily by the direction sine of the signal wavefront.

It is yet another object of the present invention to provide a means for radiating or receiving time-shifted replicas of the same digitally code-modulated signal such that these replicas combine in perfect coincidence in time or phase in only one particular radial direction and noncoincidence in all other radial directions.

These and other objects and features of this invention will become apparent from the claims, and from the following description when read in conjunction with the accompanying drawings.

BRIEF DESCRIPTION OF THE DRAWINGS

FIG. 3 is a schematic illustration of one way of arranging a plurality of antennas for implementing embodiments of the present invention wherein the orientation of the line through a pair of hopped positions is varied, but the distance separating them is held fixed.

FIGS. 4(a) and (b) are schematic illustrations of ways of arranging a plurality of antennas for implementing embodiments of the present invention wherein both the orientation of the line through and the separation between pairs of hopped positions can be varied.

DETAILED DESCRIPTION

The present invention relates to both transmitting and receiving systems and methods for imparting to an outgoing signal or to an incident signal a modulation whose measure depends on the radial direction along which its wavefront is traced out of the transmitter or is incident on a receiver. Although primary emphasis is placed herein on inducing direction-dependent modulation of a signal to effect direction-dependent reduction of its spectral density within its original bandwidth for the purpose of reducing mutual interference between signals overlapping in time-frequency plane, but having different directions, the methods for achieving this may also be used to reduce signal detectability in all directions save within a selectable narrow solid angle, to enhance system anti-jam processing gain, to reduce if not altogether eliminate the effects of multipath propagation, to separate multipath signals and to multiplex and demultiplex signals on the basis of different directions of propagation.

In one method of implementation for carrying out the intent of the present invention, two or more physically separated antennas are employed with their terminals connected to a single output or input through a single-pole multiple-throw switch. The switch position connecting the "single-pole" to one of the various "throws" is then controlled so as to move its "throw" point from the terminals of one of the antennas to those of the other. This process will be called *antenna hopping* if the *transition* of the connection from one antenna to the next is performed in a manner that is effectively *abrupt*; i.e., with no significant time difference between completely disconnecting one antenna and completely connecting the next. It will be referred to as *antenna commutation* if the transition is performed gradually; i.e., with a significant time difference between disconnection of one antenna and connection of the next.

Figure 1A:
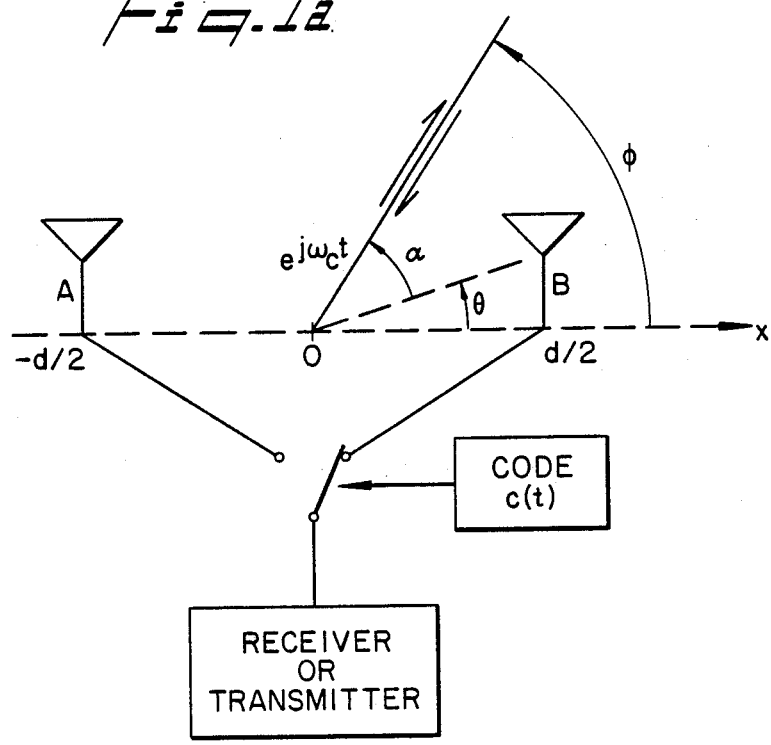
FIGS. 1(*a*) and (*b*) are a schematic illustration of an embodiment of the present invention employing hopping between two separated antennas for modulating either an incident signal or a radiated signal in a manner useful for discriminating between signals on the basis of the spatial orientations of the normals to their traveling wavefronts.

The simplest antenna hopping arrangement is illustrated in FIG. 1. Two antennas (A,B) are positioned at $x = \pm d/2$. A plane wavefront representing an unmodulated sinusoidal carrier $\exp j\omega_c t$ is incident at radial angle $\phi$ relative to the line connecting the two antennas. The phase as sensed at the midpoint, $x=0$, is taken as reference. The signal as sensed at $x=d/2$ is then represented by $\exp j(\omega_c t - \Delta\psi)$, and at $x=-d/2$ by $\exp j(\omega_c t + \Delta\psi)$, where $\Delta\psi = \pi d/\lambda_c \cos \phi$, and $\lambda_c$ is the incident wavelength. Thus, if the receiver input is switched from the output of one of the antennas to that of the other, the received signal is given by $$e_{rec}(t) = e^{j\psi(t)} \cdot e^{j\omega_c t} \tag{1}$$

where $$\psi(t) = +\Delta\psi \text{ or } -\Delta\psi, \quad \Delta\psi = (\pi d/\lambda_c) \cos \phi$$

Figure 1B:
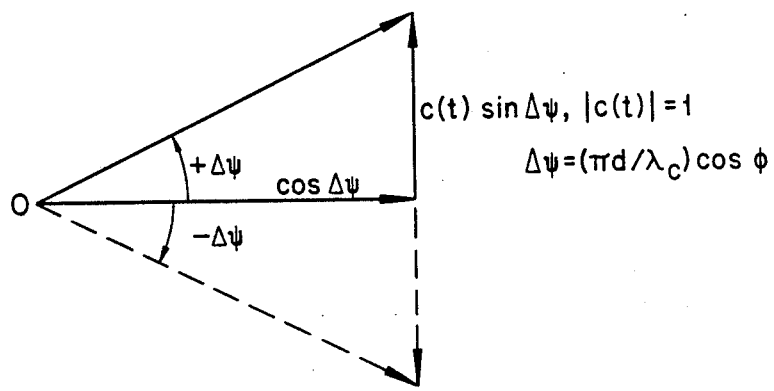

In this way, binary PSK may be applied to the signal in accordance with some code. The applied phase shift is a maximum of $\pi d/\lambda_c$ rad in the directions $\phi=0$ and $\pi$, and a minimum of 0 rad for $\phi=/2$. For $d=\lambda_c/2$, $\Delta\psi = (\pi/2) \cos \phi$, representing phase-reversal modulation in the directions along the line connecting the antennas. Note that $$e^{j\psi(t)} = \cos\Delta\psi \pm j \sin \Delta\psi$$

which, as illustrated in FIG. 1(b), shows that the received signal can be decomposed into a carrier reference component of amplitude $\cos \Delta\psi$, and an orthogonally phased phase-reversal modulated component of amplitude $\sin \Delta\psi$.

Now let the antenna hopping be determined by a coded binary sequence $c(t)$ of rectangular pulses, each of unit height, duration $T_b$ sec and positive or negative polarity. The received signal is then represented by $$e^{j\omega_c t} \cdot e^{j\Delta\psi c(t)} = (\cos \Delta\psi)e^{j\omega_c t} + (\sin \Delta\psi)c(t)e^{j(\omega_c t + \pi/2)} \tag{2}$$

$$= e^{j\omega_c t}, \text{ for } \phi = \pi/2 \tag{3}$$

$$= c(t)e^{j(\omega_c t + \pi/2)}, \text{ for } |\Delta\psi| = (\pi d/\lambda_c)|\cos \phi|$$

$$= (\text{odd integer})\pi/2$$

or for $|\cos \phi| = (\text{odd integer})/(2d/\lambda_c) \leq 1$ \qquad (4)

This shows that binary antenna hopping according to the code waveform $c(t)$ diverts power from $e^{j\omega_c t}$ to $c(t)e^{j(\omega_c t + \pi/2)}$ by a percentage given by $100 \sin^2\{(\pi d/\lambda_c) \cos \phi\}$, spreading this diverted percentage of the total power in accordance with the spectral density of the code waveform $c(t)$. The percentage of the total signal power spread over frequency in this manner is determined, for a given separation $d/\lambda_c$ of antennas, by the direction cosine, $\cos \phi$, of the wavefront relative to the line connecting the two antennas. None of the power in $e^{j\omega_c t}$ is spread out in this manner for $\phi = \pi/2$, and all of it is spread out for direction cosines satisfying Eq. (4), this latter implying phase steps of $\pm \pi/2$ or odd multiples thereof.

Equation (4) also shows that the separation between antennas provides a means for ensuring that the whole power of an undesired signal is diverted to a spectrally spread form for whatever the angle of arrival, $\phi$, happens to be. This may be done by (a) Actually moving the two antennas apart to the separation that results in the full diversion (b) Having several antennas in a row, and switching between the first and another spaced close to the required separation. Thus, the line connecting two antennas can be oriented so that it is orthogonal to the direction of arrival of a desired signal to ensure that none of its power is diverted by the antenna hopping, and, simultaneously, the separation between the two hopped antennas can be adjusted so that Eq. (4) is satisfied for the direction of arrival of an undesired signal.

M'ary PSK can be applied to a signal by antenna hopping among M different positions. Simple illustrative arrangements are shown in FIGS. 2(a) and (b), 3 and 4.

Figures 2A, 2B, 2C:
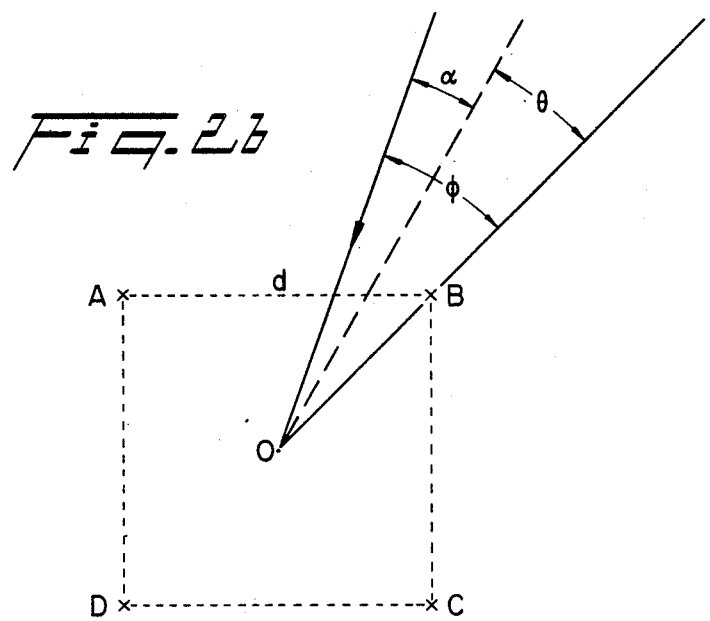
FIGS. 2(*a*), (*b*) and (*c*) are a schematic illustration of two ways of arranging four antennas for implementing corresponding embodiments of the present invention employing hopping between four spaced antennas in order to modulate a signal in a manner useful for discriminating between signals on the basis of the spatial orientations of the normals to their traveling wavefronts.

Consider, for example, the arrangement of four antennas at the corners of a square, as illustrated in FIG. 2(b). Here, with the phase reference taken at the center point, O, the signal there is represented by $e^{j\omega_c t}$. At the four corners, with s(t) representing sensed signal, $$s_A(t) = e^{j\sqrt{2}\pi(d/\lambda_c) \cos \alpha \sin \theta} \cdot e^{j\omega_c t}$$

$$s_B(t) = e^{-\sqrt{2}\pi(d/\lambda_c) \cos \alpha \cos \frac{1}{2}} \cdot e^{j\omega_c t}$$

$$s_C(t) = e^{-j\sqrt{2}/\pi(d/\lambda_c) \cos \alpha \sin \theta} \cdot e^{j\omega_c t}$$

$$s_D(t) = e^{j\sqrt{2}\pi(d/\lambda_c) \cos \alpha \cos \theta} \cdot e^{j\omega_c t}$$

The hopping possibilities are indicated in FIG. 2(c).

The antenna positions, of course, need not fall into regular formations, but could be preplanned for arbitrary patterns and spacings, fixed or adjustable, to satisfy particular designs.

One may also start by forming alternative combinations of outputs of spaced antennas, and then hop among these combinations. For a simple, useful example, the pairwise differences between outputs of spaced antennas have direction-dependent amplitudes. Specifically, the difference between the outputs of the two antennas of FIG. 1 in response to an incident signal wave represented by $\cos \omega_c t$ is represented by $\cos \alpha \sin \{\pi(d/\lambda_c) \cos \phi\} \sin \omega_c t$. Thus, direction-dependent amplitude-shift keying (abbreviated, ASK) results from hopping among the differences between the outputs of such pairs of antennas.

Antenna hopping as described thus far is characterized by the condition of zero transition time between antennas. It is clearly a process of impulse sampling of antenna position—and hence phase shift due to propagation delay—followed by zero-order hold. The result is PSK, in antenna position to antenna position hopping, and ASK in hopping between differences in signals received at different positions.

Introducing a nonzero transition time between antennas and building frequency selectivity into the tap connectors/feeds provide potent means to shape profoundly the outcome of antenna switching. Effective frequency selectivity is quite readily introduced by shaping the gate (or window, or blending) time function for activating and deactivating each antenna position. Accordingly, another method of implementation for accomplishing the intent of this invention is to employ a single-pole, multiple-throw switch that is controlled so as to commute the single-pole through the various throw positions, taking nonzero time to transit from one throw position to the next to simulate a single antenna in actual motion with finite speed.

Taking nonzero time to transit from one throw position of the switch to the next is equivalent to having the throw positions activated all the time, and connected to the spaced antenna locations, and then making one antenna commute at finite speed between and through the spaced locations, where it becomes activated and deactivated in the manner defined for each live throw position by a sampling gate function in the transmit mode, and impulsively in the receive mode. Antenna motion relative to a wavefront induces a Doppler frequency shift on a signal received, or a signal conveyed by a radiated traveling wave. Variation, or modulation, of the antenna velocity vector results in modulation of the Doppler frequency shift. The resulting Doppler-shift modulation will depend on the direction cosine of the antenna velocity vector relative to the normal to the incident, or emitted, wavefront, and on the time variation of the magnitude of the relative velocity vector. We call such induced Doppler-shift modulation "induced directional frequency modulation," or IDFM. The curve connecting the antenna positions traced in sequence by the commutator is called generally the "path of motion," or POM, and in special cases the "circle of motion," or COM, and the "line of motion," or LOM. The methods of the present invention relating to IDFM extend the IDFM concept of Applicant's U.S. Pat. No. 4,088,955 to situations in which the time-dependence characteristics of the IDFM must be tailored to the requirements of one or another of the objects stated above under BACKGROUND OF THE INVENTION.

A direct application of the well-known sampling theorem shows that if three or more antennas are spaced closer than one-half of a wavelength of the signal, and are commutated through a sampling window function occupying an area of less than 3 in the time-frequency plane, then the result of the commutation will be very nearly equivalent to the output of one antenna moving continuously between and through the repetitively commutated, discrete, fixed antenna positions.

As in the case of abrupt-hopping-and-hold antenna switching, blended commutation that satisfies the conditions for equivalence to a single moving antenna results in multiplying an emitted or incident sinusoidal carrier, represented by $e^{j\omega_c t}$, by a phase-modulating factor $e^{j\psi(t)}$, where $\psi(t)$ describes the variation of the phase of $e^{j\omega_c t}$ with motion along the antenna POM. The IDFM resulting from this motion is represented by $\psi(t)$.

Specific illustrations of practical interest include, but are not restricted to, the following:

(i) Traversing a rectilinear LOM in one direction at constant speed, with abrupt return from the last position on the LOM to the first, which results in $$\psi(t) = \{2\pi f_m(D/\lambda_c) \cos \phi\} t, \ 0 \leq t \leq 1/f_m, \ \text{mod} \ 1/f_m$$

This represents sawtooth phase modulation, effecting a constant frequency shift of $2\pi f_m(D/\lambda_c) \cos \phi$ during each traversal of the LOM.

(ii) Traversing a rectilinear LOM in alternating directions at the same constant forward and return speed, which results in squarewave FM, with $$\psi(t) = \{2\pi \cdot 2f_m(D/\lambda_c) \cos \phi\} t \cdot e_{sq}(t),$$

where $e_{sq}(t)$ represents a squarewave of unit amplitude and period $1/f_m$ sec. If $e_{sq}(t)$ is replaced by a code waveform c(t), then binary FSK results if c(t) is binary (some sequence of $+1$'s and $-1$'s). M'ary FSK results if the speed of each traversal of the LOM is selected from a set of M constant values.

(iii) Traversing a rectilinear LOM in either direction with constant acceleration. During each such traversal, of duration $T_m$, $$\psi(t) = \{(\Delta\omega)_{max}(1/T_m) \cos \phi\} \cdot t^2/2, \quad 0 \le t \le T_m$$

This results in linear FM with a direction-dependent slope.

All of the above ways of imparting IDFM to a signal, as well as other ways not restricted to employing rectilinear LOM's or for that matter circular, elliptical or other regular shapes, convert direction of arrival (DOA) difference, when applied at the receiver, and direction of departure (DOD) difference when applied at the emitter, into a frequency difference. Doppler-shift modulation of the form iii), applied at the emitter, converts propagation time difference to frequency difference, and provides a method of spreading the spectrum of a signal, outgoing or incoming, by linear FM (also known as chirp) modulation with a direction-dependent frequency slope, and hence, width of spectral spreading.

Figure 5B:
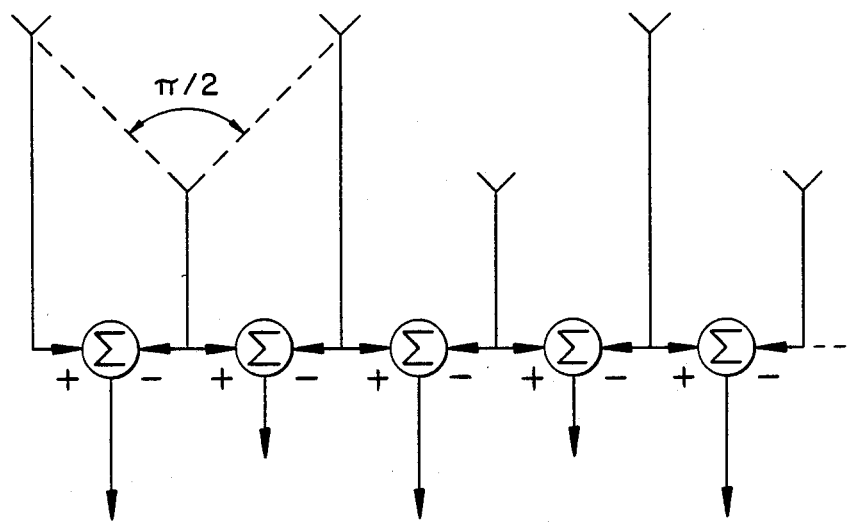
FIGS. 5(a) and (b) are schematic illustrations representing variations on yet another embodiment of the present invention in which the differences between outputs of pairs of antennas are first derived, and then the switching, commutation or combination is done among said differences in order to modulate a signal in a manner useful for discriminating between signals on the basis of the spatial orientations of the normals to their traveling wavefronts.
Figure 5A:
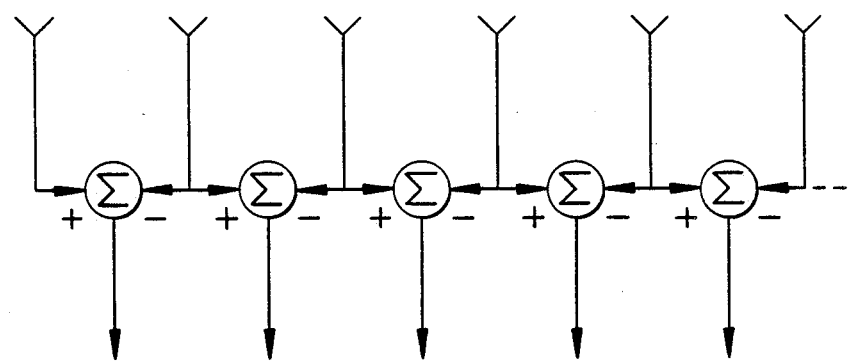

Reference is now made to FIGS. 5(a) and (b) which are schematic illustrations representing variations on yet another embodiment of the present invention in which the *differences* between outputs of pairs of antennas are first derived, and then the switching, commutation or a linear combination is effected among said differences. If the separation between pairs of antennas whose outputs are differenced is denoted $s_a$, and $\lambda_c$ is the wavelength of a signal $\cos \omega_c t$ incident along a radial at an angle $\phi$ with the line connecting a pair of antennas as shown in FIG. 1, then the difference between the outputs of the pair, if the incident signal at the midpoint between the antennas is described by $\cos \omega_c t$, is represented by $$\cos \alpha \sin \{\pi(s_a/\lambda_c) \cos \phi\} \sin \omega_c t \quad (5)$$

which for $s_a < \lambda_c/4$ can be approximated by $$\cos \alpha\{\pi(s_a/\lambda_c) \cos \phi\}\sin \omega_c t \quad (6)$$

Note that for $$(s_a/\lambda_c) \cos \phi = (\text{integer})\pi$$

the difference signal (5) vanishes. This indicates a directional null obtainable by setting $$s_a = (\text{integer})\lambda_c/\cos \phi \quad (7)$$

In the case where the antennas are all arranged along a straight line, the separations between antennas are all equal, and the blending is effective in suppressing all sampling off-bands, the result of commutation among the difference signals typified by (6) is a signal representable by $$\cos \alpha\{\pi(s_a/\lambda_c) \cos \phi\}\sin \{\omega_c t + \psi(t)\}, s_a/\lambda_c < 1/4 \quad (8)$$

where $\psi(t)$ is the IDFM due to the commutation. The amplitude of the difference signal represented by (6), and of the signal (8) out of the commutation of the various pairwise difference signals, clearly carries the direction cosine of the incident wavefront. Detection of this amplitude thus provides a measure of the direction cosine that can be used to control the orientation of the antenna LOM relative to the incident ray path of a signal. Moreover, the carrier factor in (8) carrying the IDFM is the Hilbert transform of the IDFM carrying signal factor, $\cos \{\omega_c t + \psi(t)\}$, that is obtained from commutating through the individual antenna outputs. If a small group delay difference $\tau_d$ is introduced between these two IDFM carrying signal factors, then the low-pass filtered (LPF) product of the two yields.

$$LPF|\sin\{\omega_c t + \psi(t)\}\cos\{\omega_c(t + \tau_d) + \quad (9)$$
$$\psi(t + \tau_d)\}| \alpha \sin\{\omega_c \tau_d + \psi(t + \tau_d) - \psi(t)\} \simeq \tau_d\{\omega_c + \dot{\psi}(t)\}$$

This shows that the IDFM waveform can be extracted by first obtaining the outputs of two blended commutators, one operating on the individual outputs of the set of POM spaced antennas, the other operating on the pairwise differences between the outputs of the antennas, delaying one of said commutator outputs by a small time difference relative to the other, and then multiplying the two and lowpass filtering the result.

Figure 6:
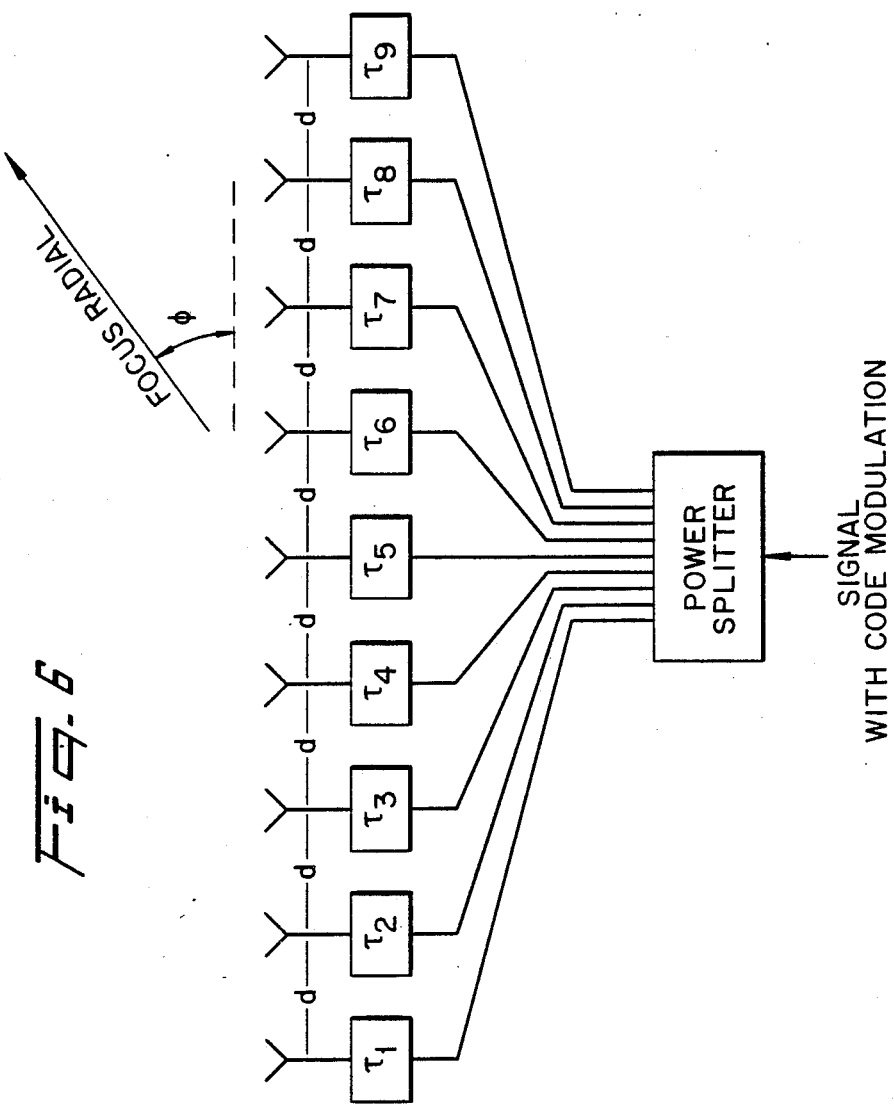
FIG. 6 is a schematic illustration of yet another embodiment of the present invention in which a set of spaced antennas is used in conjunction with feedlines incorporating adjustable or controllable gains, delays and phase shifts as a means to cause a signal to acquire characteristics that make it appear to be different along differently oriented radials.

The direction-dependent propagation time between spaced antennas can be exploited in yet another manner: With appropriate premodulation, a signal can be radiated so that its energy is "focused" within a welldefined solid angle, and effectively "defocused" outside of it. The schematic of FIG. 6 illustrates an embodiment for accomplishing this by the method of synthesizing desired signal characteristics of this disclosure, wherein each of a set of spaced antennas is continuously connected to the signal source, or to a receiver. In FIG. 6

$$\tau_1 = 9\tau_d$$
$$\tau_2 = 8\tau_d$$
$$.\quad.$$
$$.\quad.$$
$$.\quad.$$
$$\tau_8 = \tau_d = (d \cos \phi)/c$$
$$\tau_9 = 0$$

With reference to FIG. 6, let the signal carry a modulation in part by a waveform characterized by an auto-correlation function with a very narrow mainlobe and very low sidelobes. If this signal is radiated simultaneously by the set of spaced antennas, the resultant signal along any radial will be the sum of replicas of the original signal, each emitted by one of the antennas in the set. The spacing between antennas and/or the orientation of the line (if such) along which they are positioned may then be set so that the various signal replicas in the far field add up with perfect alignment in modulation time/phase along a particular radial. We call this *signal focusing* along said particular radial. Outside of a narrow solid angle (or cone) centered about the radial of perfect modulation time/phase alignment, the various replicas of the signal will add up with their modulations misaligned sufficiently to be in disarray, causing their resultant to be not so well detectable. We call this *siganl defocusing*. The direction of perfect focusing can be steered by introducing delay differences in the antennae feedlines to directly compensate for (or zero out) the direction-dependent propagation delay differences due to the spacing between antennas. The width of the autocorrelation mainlobe mentioned earlier determines the solid angle of the cone of near-perfect modulation alignments, or signal focusing, outside of which the signal replicas can be said to combine noncoherently, or to be defocused.

Just as hopping and commutation among spaced antennas can be used as described above to spread out the signal energy in spectrum, hopping and commutation between spaced antennas can be used to reassemble signal energy into a spectrally despread form. One embodiment of this method is to hop between a set of spaced antennas in such a way as to compensate for and hence eliminate phase jumps carried by an arriving or, for a particular direction, a departing wavefront. Other embodiments employ commutation among antennas arranged along a path of motion, possibly with nonuniform (and, for some purposes, variable/controllable) spacing between antennas, all designed to induce a frequency modulation that cancels out an a priori known or detectable frequency modulation on an incident signal. Indeed, the principles underlying signal modulation by switching or commutating among a set of spaced antennas, as described in this disclosure, can be applied to impart to an incident signal a modulation that cancels out any particular modulation component (such as frequency hopping, PSK, ASK, analog modulation) or some combination of modulations on that signal.

Up to this point in this disclosure, it has been presumed that the discrete time instants for abrupt switching are uniformly spaced, or the transit times for the antenna motion between consecutively tapped antenna positions are equal. We refer to this type of switching/commutation as uniform. We now consider nonuniform switching/commutation.

The results of nonuniform switching/commutation can be modeled by forms of pulse-time modulation. As in the case of uniform switching or uniform commutation, the output can be expressed as the response of a linear filter whose impulse response is the switching hold (for PSK) or blending (for IDFM) function, and whose input is the sequence of the time-position modulated impulse samples of $e^{j\psi(t)} \cdot e^{j\omega_c t}$.

In order to formulate expressions for the outcome of nonuniform switching/sampling, we first recognize that the effect of switching/commutation is to multiply the signal (either incident or emitted) by $e_{com}(t)$, where in the case of uniformly spaced switching/commutator samples $$e_{com}(t) = h_b(t) \left\{ e^{j\psi(t)} \sum_{n=-\infty}^{\infty} u_o(t - nT_s) \right\} \quad (10)$$

$$= h_b(t) \left\{ e^{j\psi(t)} \cdot \frac{1}{T_s} \sum_{n=-\infty}^{\infty} e^{jn\omega_s t} \right\}, \omega_s = 2\pi/T_s$$

where $h_b(t)$ is the blending function for IDFM, or the hold function for PSK switching; $e^{j\psi(t)}$ is the POM phase-shift factor; $u_o(t-nT_s)$ is the unit impulse at $t=nT_s$; $T_s$ is the time between consecutive samples (the hold time or bit duration for PSK); and $f_s=1/T_s=\omega_s/2\pi$ is the sampling frequency for IDFM commutation. We can readily show that if the unit impulses are time-position modulated by a time function $e_m(t)$, then the resulting time-position-modulated (TPM) unit impulse train can be expressed as $$u_{o,pm}(t) = [1 - ke_m(t)] \sum_{n=-\infty}^{\infty} u_o(t - nT_s - ke_m(t)) \quad (11)$$

$$= \frac{1}{T_s} [1 - ke_m(t)] \sum_{n=-\infty}^{\infty} e^{jn\omega_s[t - ke_m(t)]}$$

Comparison of Eq. (6) with $$u_{o, T_s}(t) = \sum_{n=-\infty}^{\infty} u_o(t - nT_s) = \frac{1}{T_s} \sum_{n=-\infty}^{\infty} e^{jn\omega_s t} \quad (12)$$

shows that time-position modulation of impulses in a train (a) may be accounted for by defining an *instantaneous frequency of sampling*

$$\omega_{si}(t) = \omega_s[1 - ke_m(t)]$$

and an associated instantaneous period of sampling $$T_{si} = 2\pi/\omega_{si}(t)$$

in the Fourier expansion of the periodic impulse train, thus generalizing Eq. (12) into the form $$u_{o,pm}(t) = \frac{\omega_{si}(t)}{2\pi} \sum_{n=-\infty}^{\infty} e^{jn \int^t \omega_{si}(\xi)d\xi} \quad (13)$$

$$= \frac{\theta_{si}(t)}{2\pi} \sum_{n=-\infty}^{\infty} e^{jn\theta_{si}(t)} \quad (14)$$

where $\theta_{si}(t)$ is the "instantaneous phase" of the sampling impulse train; and (b) is equivalent to envelope modulation by $e_m(t)$ and phase modulation by $e_m(t)$ of each of the sinusoidal components of the periodic train with a peak phase deviation that is proportional to the harmonic order of the component.

On the basis of (a) and Eq. (14), a train of position-modulated impulses may be considered as a frequency or phase-modulated impulse carrier having an instantaneous frequency that defines an instantaneous frequency of sampling. Thus, an impulse train, like a sinusoidal carrier, may be said to possess an "instantaneous weight," an "instantaneous frequency" and an "instantaneous phase" each of which can be modulated.

Figure 7A:
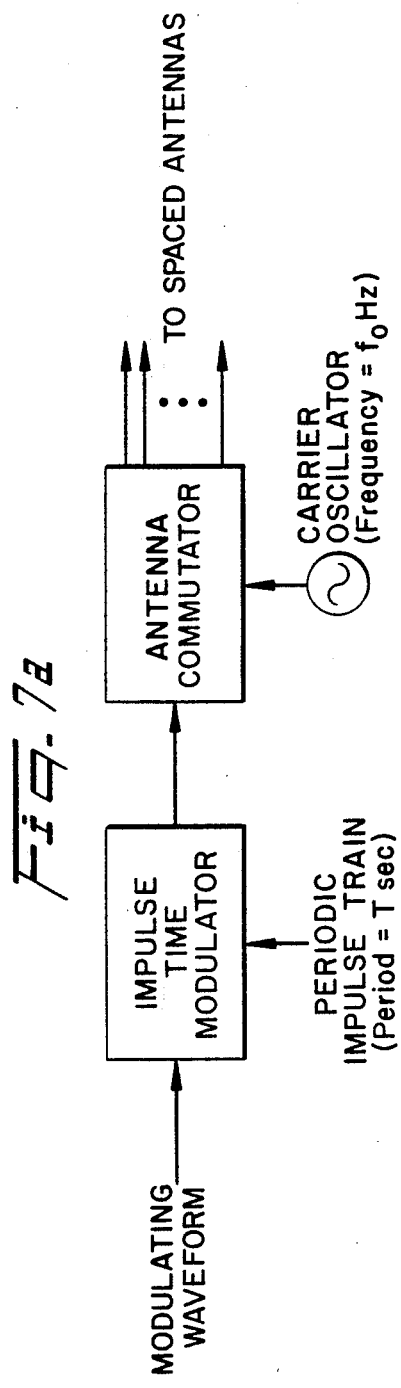
FIGS. 7(a) and (b) are schematic illustrations of embodiments of the present invention for generating frequency modulated signal waves that are characterized by carrier frequencies which may be independently controlled to satisfy any prescribed specifications on frequency value and/or stability.

Nonuniform timing between phase jumps, and of transit time between consecutively connected antennas, may be prearranged for either by the design of the spacing between antennas, or by employing a phase-modulated timing clock for controlling the commutation, as illustrated in FIG. 7(a), or by a combination of both.

Figure 7B:
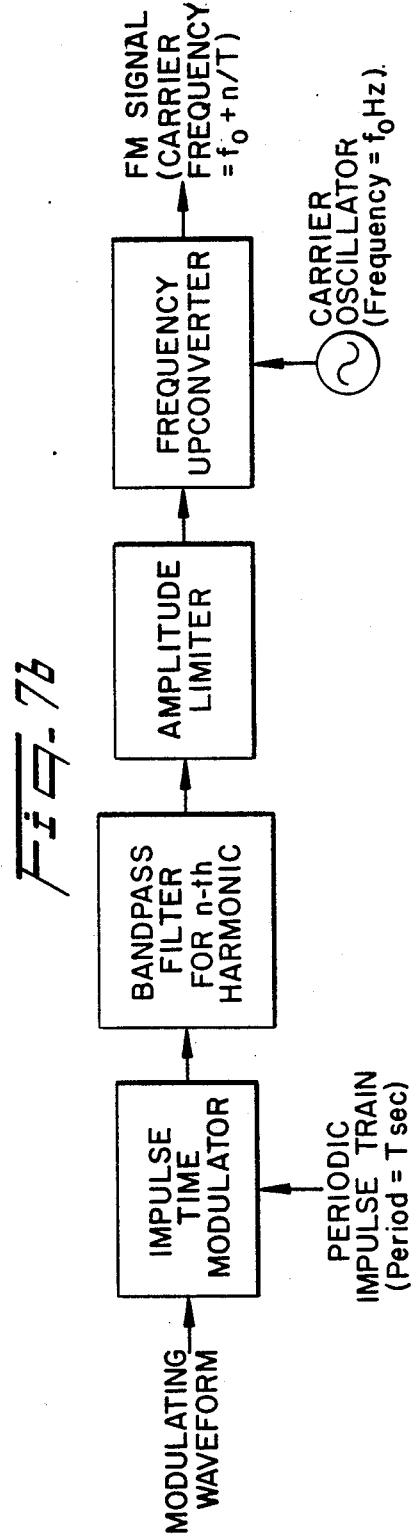

FIG. 7(b) illustrates a method of generating a frequency-modulated signal wave of unrestricted frequency-modulation index, characterized by carrier frequencies which may be independently controlled to satisfy any prescribed specifications on frequency value and/or frequency stability, based on the use of a phase-modulated periodic train of very short pulses, as expressed in Eqs. (13) and (15), in conjunction with an oscillator that satisfies the specified tolerance on frequency instability.

While there has been described what is at present considered to be representative embodiments of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. A method of receiving a signal wave occupying a predetermined bandwidth that imparts to it a digital modulation whose level depends on the direction of arrival of the signal wavefront, and which as a result creates a digitally modulated component signal embodying energy diverted from the arriving signal to a more widely spread spectrum, and hence reduces the signal spectral density within said predetermined bandwidth, the fraction of the total arriving signal energy so diverted being dependent on the direction of arrival of the signal wavefront, comprising the steps of:

providing a set of different positions in space for intercepting an arriving signal wavefront;

controlling the time of the reception from each of said different positions to abruptly hop among said positions, which in effect times the introduction into the received signal of an abrupt direction-dependent shift;

adjusting the separation between successively hopped positions of signal wavefront interception; and adjusting the orientation of the line segment between successively hopped positions of signal wavefront interception.

2. The method of claim 1 wherein said control of the time of the reception from each of said different positions includes:

causing the reception to occur from only one position at a time; and abruptly hopping the position of the reception, thereby introducing direction-dependent phase/time of arrival jumps into the received signal.

3. The method of claim 2 wherein said intercepting is effected with one receiving antenna, and said abrupt hopping of the position of the reception is effected by abrupt physical transport of said receiving antenna from one designated position to another.

4. The method of claim 2 wherein said intercepting is accomplished by a plurality of antennas mounted at separate positions, and said abrupt hopping of the position of the interception is effected by switching.

5. The method of claim 2 wherein said adjusting of the separation, and said adjusting of the orientation of the line segment between successive reception positions are by automatic control.

6. The method of claim 2 wherein said intercepting is accomplished by two separate antennas, and said adjusting of the separation, and said adjusting of the orientation are set (a) to cause no imparted phase jumps to occur in signals arriving from a selected radial direction and (b) at the same time, to cause, for signals arriving from a certain other selected radial direction, $a \pm \pi/2$ rad phase-jump modulation.

7. The method of claim 1 wherein said control of the time of reception from each of said different positions includes:

causing the reception to occur from one of a plurality of combinations of at least two positions at a time; and switching the reception from one of said combinations to another of said combinations.

8. The method of claim 7 wherein said intercepting is by an arrangement of antennas positioned over a plurality of dimensions in space, including adjusting of the separation between pairs of antennas and of the orientation of the line segment spanned by each said separation in order to cause no imparted modulation to occur for signals arriving from certain radial directions and occupying a predetermined bandwidth, while at the same time causing imparted modulation and hence power/energy spectral spreading to occur for signals arriving from certain other radial directions and occupying said predetermined bandwidth thus reducing their spectral densities within said predetermined bandwidth.

9. The method of claim 7 wherein each of said combinations of positions consists of the difference between simultaneous receptions at separate positions taken two at a time.

10. The method of claim 9 wherein the separation between antennas whose outputs are combined subtractively is preset so that said difference is zero for specified radial directions.

11. The method of claim 9 wherein said adjusting of separation and orientation is actuated automatically by a control signal determined by said difference between simultaneous receptions at the positions whose separation and connecting line orientations are being adjusted.

12. An apparatus for receiving signal waves of generally the same frequency within a predetermined bandwidth, incident from a plurality of different directions, and for rejecting signal power/energy incident from all but one desired direction, comprising:

antenna means having a set of different positions in space for intercepting signal wavefronts incident from a plurality of different radial directions;

means for controlling the time of the reception from each of said different positions to abruptly hop among said positions, which in effect times the introduction into the received signal of an abrupt direction-dependent shift;

means for adjusting the separation between successively hopped positions and the orientation of the connecting line segment between said successively hopped positions; and means for selecting signal waves from a desired direction, occupying said predetermined bandwidth, nonresponsive to signal waves arriving from other than said desired direction.

13. The apparatus of claim 12 wherein said selecting means includes:

filter means, responsive to said means for adjusting the orientation of the line connecting pairs of consecutively hopped antenna positions so that signals incident from a particular direction arrive in phase at all of the spaced antenna positions and hence experience no phase jumps as a result of hopping the reception from antenna position to antenna position, whereas signals from other directions experience phase jumps which causes a fraction of their power/energy to be spread out in frequency spectrum outside of, and hence causes their power/energy spectral density to be reduced within, said predetermined bandwidth, said filter means selecting the frequency range of said desired signal and suppressing all signal power/energy outside of said frequency range, thus reducing the passed power/energy of signals arriving from directions other than said particular direction.

14. A method of radiating a signal wave originated within a predetermined bandwidth that imparts to it a digital modulation whose level is direction-dependent and which as a result creates a digitally stepped-phase-modulated component signal wave representing a diversion of a direction-dependent fraction of the radiated power/energy to a more widely spread spectrum and hence reduced spectral density within said predetermined bandwidth, comprising the steps of:
  providing a set of different positions for effecting radiation;
  controlling the time of the radiation from each of said different positions, thereby introducing abrupt direction dependent shifts in the radiated signal from one of said positions to another; and
  adjusting the separation and orientation of the connecting line segment between pairs of positions.

15. The method of claim 14 wherein said controlling the time of the radiation from each of said different positions includes the steps of:
  causing the radiation to occur from only one position at a time; and
  abruptly hopping the position of the point of radiation thereby introducing direction-dependent phase/time jumps into the radiated signal.

16. The method of claim 15 wherein said radiation is from one radiating antenna, and said abrupt hopping of the position of the point of radiation is accomplished by abrupt physical transport of the radiating antenna from one position to another.

17. The method of claim 15 wherein said radiation is from a plurality of antennas mounted at separate positions, and said abrupt hopping of the position of the point of radiation is by switching among members of the plurality of antennas.

18. The method of claim 15 wherein said adjusting of the separation between successive radiation positions is effected by automatic control.

19. The method of claim 15 wherein said radiation is from two separate antennas, and said adjusting of the separation and orientation is set (a) to cause no imparted phase jumps, to occur in signals radiated in a certain radial direction, and (b) at the same time to cause, for signals radiated in a certain other radial direction $\pm \pi/2$ rad phase-jump modulation.

20. The method of claim 14 wherein said control of the time of radiation from each of said different positions includes the steps of:
  causing the radiation to occur from one of a plurality of combinations of more than one position at a time; and
  hopping abruptly from one of said combinations of positions to another of said combinations of positions.

21. The method of claim 20 wherein said radiation is from an arrangement of antennas positioned over a plurality of dimensions in space, with adjustable separation between pairs of antennas and adjustable orientation of the line segment spanned by each said separation in order to cause no imparted modulation to occur in certain radial directions, and diversion of radiated signal wave power/energy to a more widely spread spectrum, and hence reduced spectral density within said predetermined bandwidth, in certain other radial directions.

22. The method of claim 14 wherein said radiation is from a plurality of antennas mounted at different positions arranged along a straight line, and said control of the time of the radiation from each of said different positions includes adjusting the delay times in the feedlines to said antenna positions for compensating for propagation time differences from said different positions to any point along a particular radial direction but not along other radials of different orientations from said particular radial direction, thus equalizing the net time/phase shift of a signal wavefront radiated simultaneously from each of said different positions to reach any point along said particular radial direction but not along other radials different from it in orientation.

23. The method of claim 14 wherein said radiation is from a plurality of antennas mounted at different positions arranged in a plurality of dimensions in space, and said control of the time of the radiation from each of said different positions includes a means for adjusting the delay times in the feedlines to said antenna positions for compensating for propagation time differences from said different positions to any point along each of a particular set of radial directions but not along other radials not included in said set of particular radial directions.

24. An apparatus for radiating signal waves of generally the same frequency intending each of said signal waves to be received along a separate direction of a propagation ray path with negligible interference from the other signal waves, comprising:
  antenna means having a set of different positions for effecting radiation;
  means for causing at least one signal wave to be radiated from a combination of unhopped antenna positions, the combination being adjusted to null out said signal wave in selected directions;
  means for causing signals other than said signal to be each radiated from only one antenna position at a time;
  means for abruptly hopping the position of the point of radiation of each of said other signals between a pair of spaced antennas assigned to it, thereby introducing direction-dependent phase jumps in the radiated signals;
  means for adjusting the separation and connecting line orientation between each pair of antennas assigned to each of said other signals so that corresponding said other signal power/energy is entirely spread out in frequency spectrum when observed along the radial direction intended for said signal radiated from a combination of unhopped antenna positions;
  means for code modulating said other signals by antenna hopping with negligibly correlated codes to limit mutual interference among them in distant receivers.

25. In a communication system wherein signal waves of generally the same frequency occupying a preassigned bandwidth are provided to a plurality of transmitters, each having a signal wave radiating position, and wherein the signal waves are transmitted from the transmitters to a receiver, having a signal wave receiving position, the improvement comprising:
  means for suppressing interference between signal waves transmitted by the plurality of transmitters including:
    means for repetitively hopping between at least two of said radiating and/or said receiving positions, thereby imparting direction-dependent phase-jump modulation on the received signal waves; and means for rejecting power/energy of signal waves from all but one of the plurality of transmitters responsive to the imparted direction-dependent phase-jump modulation of the signal waves.

26. In a system wherein signal waves are radiated from at least one radiating position and the signal waves are received at a receiving position from a plurality of different directions, a method of reducing interference by reducing received power/energy of signal waves from all but one of the plurality of directions comprising the steps of:

repetitively hopping, among at least two spaced points, the position of at least one of said radiating and receiving positions according to a predetermined switching code/sequence thereby imparting direction-dependent phase-jump modulation in the received signal waves; and reducing by filter means received power/energy of signal waves from all but one of the plurality of directions based on dispersal in frequency spectrum of the power/energy of said signal waves resulting from the imparted direction-dependent phase-jump modulation thereof.

27. The method of claim 26 wherein the one of said radiating and receiving positions is repetitively hopped by switching the position of an antenna element among at least two predetermined spaced points.

28. The method of claim 26 wherein said radiating position is repetitively hopped by sequentially switching a transmitter output among a plurality of antenna elements positioned at separated points.

29. The method of claim 26 wherein said receiving position is repetitively hopped by sequentially switching a receiver input among a plurality of antenna elements positioned at separated points.

30. The method of claim 29 wherein said radiating position is abruptly hopped to impose direction-dependent phase-jump modulation on the radiated signal waves and wherein the signal waves from a selected direction are despread in frequency spectrum by:

repetitively hopping the receiving position among a set of spaced points arranged to cancel the direction-dependent phase-jump modulation carried by the signal waves incident from said selected direction; and filtering the signal waves from the receiving position to reduce the accepted power/energy of signal waves incident from other than said selected direction of incidence having direction-dependent phase-jump modulation.

31. The method of claim 26 wherein the one of said radiating and receiving positions is hopped among a plurality of generally nonuniformly spaced points in a known sequence.

32. A method for selecting signal waves originating within a predetermined bandwidth and arriving from a particular direction comprising the steps of:

providing at least one position for radiating signal waves;

providing at least one position for receiving the signal waves;

abruptly hopping one of said radiating and receiving positions among a set of spaced positions thereby imparting direction-dependent phase-jump modulation in the signal waves; and selecting signal waves from the desired direction within said predetermined bandwidth responsive to the imposed direction-dependent phase-jump modulation of the signal waves.

33. The method of claim 32 wherein the signal waves from the desired direction are selected by:

modifying the signal waves from the receiving position to cancel the direction-dependent phase-jump modulation imposed on the signal waves from said particular direction; and filtering the signal waves to reject energy falling outside of said predetermined bandwidth, belonging to signal waves that retain direction-dependent phase-jump modulation.

* * * * *